June 11, 1957   R. H. D. CHAMBERLIN   2,795,110
TORQUE TRANSMITTING COUPLING UNIT FOR
COMBUSTION TURBINE POWER UNITS
Filed April 4, 1956   2 Sheets-Sheet 1
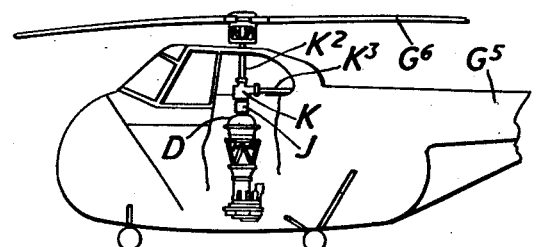
FIG. 1.
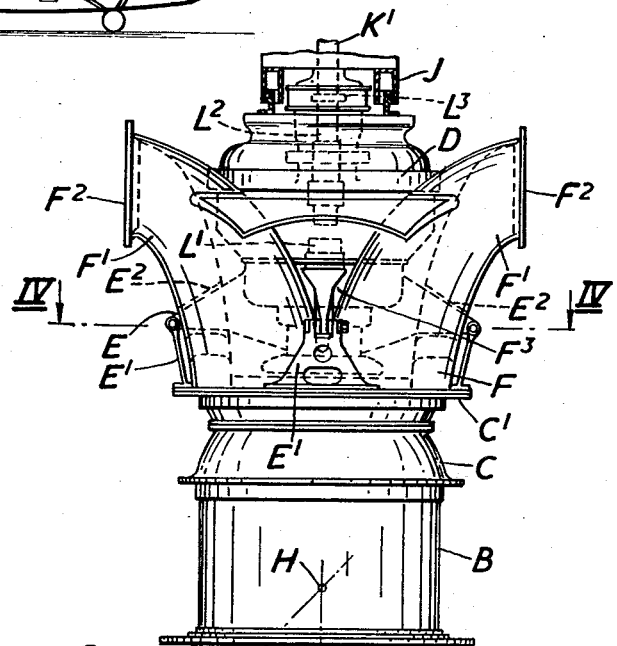
FIG. 2.
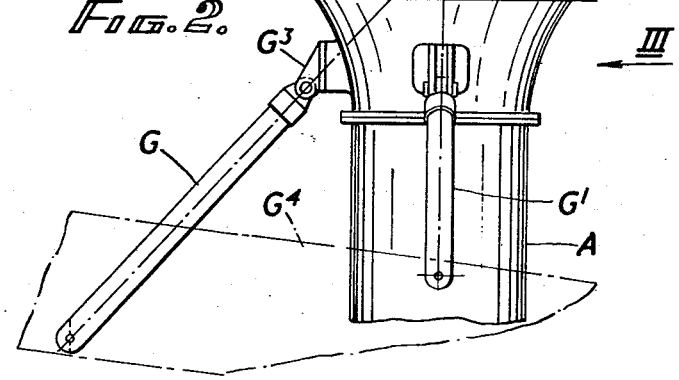
INVENTOR
Reginald H. D. Chamberlin
BY Watson, Cole, Grindle
& Watson ATTORNEYS June 11, 1957    R. H. D. CHAMBERLIN    2,795,110
TORQUE TRANSMITTING COUPLING UNIT FOR
COMBUSTION TURBINE POWER UNITS Filed April 4, 1956                  2 Sheets-Sheet 2

INVENTOR
Reginald H. D. Chamberlin

BY Watson, Cole, Grindle &
Watson    ATTORNEYS 2,795,110
Patented June 11, 1957

2,795,110

TORQUE TRANSMITTING COUPLING UNIT FOR COMBUSTION TURBINE POWER UNITS

Reginald Henry Douglas Chamberlin, Ealing, London, England, assignor to D. Napier & Son Limited, London, England, a British company Application April 4, 1956, Serial No. 576,100

Claims priority, application Great Britain April 7, 1955

3 Claims. (Cl. 60—39.75)

This invention relates to combustion turbine power units of the kind comprising a turbine-driven air compressor and a power turbine disposed at the opposite ends of a combustion chamber or series of combustion chambers to which the compressor delivers combustion air and from which the products of combustion pass through the power turbine which is connected through reduction gearing (herein termed the power unit reduction gearing) to a power output shaft. This shaft may be connected, for example, to a propeller of a fixed wing aircraft or a rotary wing system of a helicopter aircraft either directly or through further reduction gearing hereinafter termed the aircraft reduction gearing. The invention is applicable to such power units whether the compressor is driven by the power turbine or by a separate compressor-driving turbine.

According to the present invention, in a combustion turbine power unit of the kind specified the power unit reduction gearing is arranged within a casing disposed on the side of the power turbine remote from the compressor and includes an input shaft coaxial with and directly driven by the power turbine while the power output shaft projects from the side of the casing remote from the power turbine, means are provided for supporting the power unit from a part thereof lying on the side of the power turbine remote from the power unit reduction gearing, and there is a torque-transmitting coupling capable of transmitting torque but not of supporting any substantial weight and comprising a part rigid with the power unit reduction gear casing and a part adapted to be rigidly connected to the air frame of an aircraft in which the power unit is installed.

Thus, in a combustion turbine power unit according to the present invention when installed in an air frame, the torque reaction from the power unit reduction gear casing is taken through the torque-transmitting coupling and therefore does not have to be transmitted through the hot part of the unit represented by the turbine, combustion chamber or chambers and possibly the exhaust ducting system of the turbine, to the mounting which carries the actual weight of the unit.

Preferably the part of the torque-transmitting coupling which is rigid with the power unit reduction gear casing is disposed coaxially with the output shaft and has an annular set of dog teeth, while the part adapted to be rigidly connected to the air frame has an annular set of dog teeth which co-operate with the dog teeth on the first part.

Where the aircraft is also provided with aircraft reduction gearing the part of the torque transmitting coupling adapted to be rigidly connected to the air frame may be the casing of the aircraft reduction gearing which is itself rigidly connected to the air frame.

The invention may be performed in various ways and one particular construction of combustion turbine power unit embodying the invention and suitable for driving the rotor of a helicopter will now be described by way of example with reference to the accompanying drawings, in which:

Figure 1 is a fragmentary side view of the helicopter partly cut away to show the power unit;

Figure 2 is a side view of the power unit on a larger scale;

Figure 3:
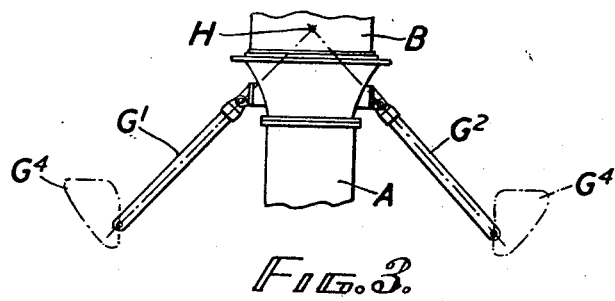
Figure 3 is a view of the lower part of the power unit as seen in the direction of the arrow III in Figure 2.
Figure 4:
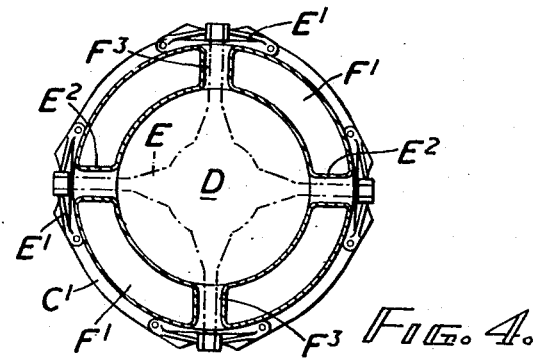
Figure 4 is a horizontal cross-section taken on the line IV—IV in Figure 2.
Figure 5:
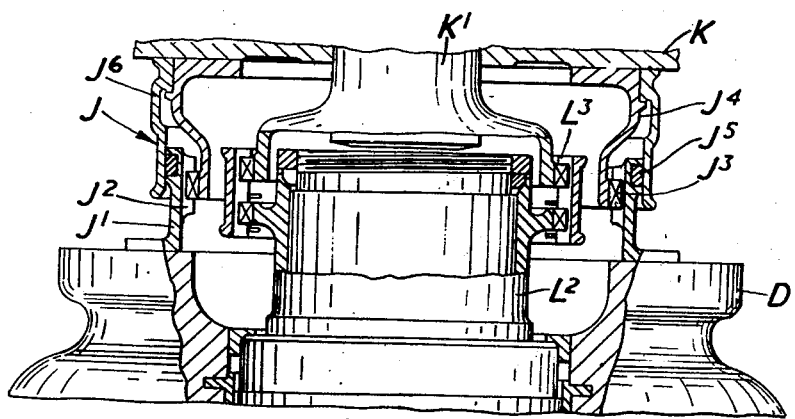
Figure 5 is a sectional view showing details of the torque transmitting coupling.

In the arrangement shown in the accompanying drawings the power unit comprises an axial flow air compressor of which the upper end of the casing is shown at A, having its air inlet at its lower end and delivering air into the lower ends of combustion chambers disposed within an enclosing casing B, from which combustion chambers the combustion products pass to a power turbine the casing of which is shown at C and which has an annular outlet surrounded by a flange $C^1$. The power turbine and compressor rotors are directly connected to one another in the usual manner and the shaft of the power turbine is also connected to the input shaft $L^1$ of the power unit reduction gearing disposed within a gear casing D which is supported from the flange $C^1$ by four connecting assemblies. Each of these assemblies comprises a radial arm E secured at its inner end to the power unit reduction gear casing D and connected at its outer end to a bracket $E^1$ which is rigidly secured to the flange $C^1$, as shown. The gear casing D is partially housed within recesses formed in an exhaust ducting comprising an approximately circular entry section indicated at F from which spring two laterally extending duct sections $F^1$ terminating in outlet openings $F^2$. As will be apparent, two of the arms E extend through the space $F^3$ between the duct sections $F^1$ while the other two extend through housings indicated at $E^2$ passing through these duct sections.

The whole unit is supported by a mounting comprising three tubular supports G, $G^1$, $G^2$ each pivoted at its inner end to a bracket on the casing of the unit as shown at $G^3$ and at its outer end to a structural member $G^4$ of the air frame of the helicopter $G^5$, the disposition of these tubular supports being such that their axes meet at a point H lying at or near to the centre of gravity of the unit.

The whole weight of the unit is thus taken by the supports G, $G^1$, $G^2$ which constitute the main supporting mounting for the unit.

Rigidly connected to the upper end of the power unit reduction gear casing D is the outer part $J^1$ of a torque transmitting coupling J which has a ring of inwardly-facing radial teeth $J^2$ thereon. These teeth $J^2$ are engaged by corresponding outwardly-facing radial dog teeth $J^3$ formed on the inner member $J^4$ of the torque transmitting coupling. The member $J^4$ is rigidly connected to the casing K of aircraft reduction gearing, which casing is itself rigidly connected to the air frame $G^5$. The torque transmitting coupling J also includes a dirt-excluding sealing ring $J^5$ which co-operates with a sleeve $J^6$ attached to the part $J^4$. The torque transmitting coupling J is capable of transmitting torque reaction from the power unit reduction gear casing D to the air frame $G^5$ through the casing of the aircraft reduction gearing K while not supporting any appreciable weight of the power unit.

The output shaft $L^2$ of the power unit reduction gearing transmits its drive through a dog type coupling $L^3$ to the input shaft $K^1$ of the aircraft reduction gearing, the output of the latter being transmitted through a shaft $K^2$ to the rotor $G^6$ of the helicopter and through a shaft $K^3$ to the tail rotor (not shown).

During operation, while the weight of the power unit is taken by the mounting G, G¹, G², the torque reaction is transmitted from the power unit reduction gear casing D through the torque transmitting coupling J and the aircraft reduction gearing casing K to the air frame G⁵ so that no appreciable torque reaction has to be transmitted from the reduction gear casing D either through the connections E, E¹ between this casing and the casing C of the turbine or through any of the highly heated parts of the unit represented by the exhaust ducting system, the turbine and the combustion assembly.

What I claim as my invention and desire to secure by Letters Patent is:

1. A combustion turbine power unit comprising at least one combustion chamber having an inlet end and an outlet end, a compressor disposed at the inlet end of said combustion chamber and adapted to deliver combustion air thereto, a power turbine disposed at the outlet end of said combustion chamber and adapted to receive combustion products therefrom, said power turbine having an inlet side adjacent said combustion chamber and an exhaust side away from said combustion chamber, a reduction gear forming part of said power unit, a casing containing said power unit reduction gear disposed on the exhaust side of said power turbine and having an input side adjacent said power turbine and an output side away from said power turbine, an input shaft which enters the input side of said power unit reduction gear casing and which is connected to said power turbine, an output shaft projecting from the output side of said power unit reduction gear casing, means supporting the power unit in a region lying on the inlet side of said power turbine, and a torque transmitting coupling capable of transmitting torque but not of supporting any substantial weight and comprising a first part rigid with said power unit reduction gear casing and a second part adapted for rigid connection to the air frame of an aircraft in which said power unit is installed.

2. A combustion turbine power unit according to claim 1 in which said first part of the torque transmitting coupling is disposed coaxially with said output shaft and in which there is a first annular set of dog teeth on said first part, and a second annular set of dog teeth which cooperates with said first annular set of dog teeth and which is mounted on said second part of the torque transmitting coupling.

3. A combustion turbine power unit according to claim 2 in which said second part of the torque transmitting coupling is constituted by the casing of a further reduction gear and this casing is adapted for rigid connection to said air frame.

No references cited.